United States Patent
(12) United States Patent
Fujiwara et al.

(10) Patent No.: US 12,736,713 B2
(45) Date of Patent: Sep. 15, 2026

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Aichi-ken (JP)

(72) Inventors: Ryotaro Fujiwara, Tokyo-to (JP); Hirotada Nakanishi, Toyota (JP); Fuhito Kodama, Nagoya (JP); Yuki Uchida, Iwakura (JP); Satoshi Komamine, Nagoya (JP); Yoshinori Okada, Okazaki (JP); Satoshi Hirano, Obu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 560 days.

(21) Appl. No.: 18/366,598

(22) Filed: Aug. 7, 2023

(65) Prior Publication Data

US 2024/0053509 A1 Feb. 15, 2024

(30) Foreign Application Priority Data

Aug. 9, 2022 (JP) ................................ 2022-127458

(51) Int. Cl.
*G01W 1/10* (2006.01)

(52) U.S. Cl.
CPC .................................... *G01W 1/10* (2013.01)

(58) Field of Classification Search
None
See application file for complete search history.

(56) References Cited

U.S. PATENT DOCUMENTS

| | | | | |
|---|---|---|---|---|
| 9,201,991 | B1 * | 12/2015 | Mewes | G06F 30/20 |
| 2016/0078570 | A1 | 3/2016 | Ethington et al. | |
| 2016/0203427 | A1 | 7/2016 | Ouchida | |
| 2019/0057460 | A1 | 2/2019 | Sakaguchi et al. | |
| 2020/0390044 | A1 * | 12/2020 | Allen | A01G 25/167 |
| 2021/0209705 | A1 * | 7/2021 | Englard | G06N 20/00 |

FOREIGN PATENT DOCUMENTS

| | | | |
|---|---|---|---|
| JP | 2015046007 | A | 3/2015 |
| JP | 2019046126 | A | 3/2019 |
| JP | 2019-144935 | A | 8/2019 |
| JP | 2019193592 | A | 11/2019 |
| KR | 102143039 | B1 | 8/2020 |
| WO | 2017/164097 | A1 | 9/2017 |

* cited by examiner

*Primary Examiner* — Walter L Lindsay, Jr.
*Assistant Examiner* — Geoffrey T Evans
(74) *Attorney, Agent, or Firm* — HAUPTMAN HAM, LLP

(57) ABSTRACT

An information processing apparatus includes a controller. In a case in which the controller predicts, based on weather data, that there will be adverse weather that could cause damage to a crop in a field, the controller is configured to present reference information and propose harvesting before the adverse weather.

8 Claims, 5 Drawing Sheets

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2022-127458 filed on Aug. 9, 2022, the entire contents of which are incorporated herein by reference.

TECHNICAL FIELD

The present disclosure relates to an information processing apparatus, a method, and a non-transitory computer readable medium.

BACKGROUND

Technology related to harvesting crops is known. For example, Patent Literature (PTL) 1 discloses technology to improve the efficiency of crop harvesting operations.

CITATION LIST

Patent Literature

PTL 1: WO 2017/164097 A1

SUMMARY

Conventional technology does not take into account facilitation of determining the harvest timing of a crop in a case in which adverse weather, such as a typhoon, is predicted and thus has room for improvement.

It would be helpful to improve technology related to harvesting a crop.

An information processing apparatus according to an embodiment of the present disclosure is an information processing apparatus including a controller, wherein in a case in which the controller predicts, based on weather data, that there will be adverse weather that could cause damage to a crop in a field, the controller is configured to present reference information and propose harvesting before the adverse weather.

A method according to an embodiment of the present disclosure is a method to be executed by an information processing apparatus, the method including:

presenting, in a case in which it is predicted based on weather data that there will be adverse weather that could cause damage to a crop in a field, reference information and proposing harvesting before the adverse weather.

A non-transitory computer readable medium according to an embodiment of the present disclosure is a non-transitory computer readable medium storing a program configured to cause an information processing apparatus to execute operations, the operations including:

presenting, in a case in which it is predicted based on weather data that there will be adverse weather that could cause damage to a crop in a field, reference information and proposing harvesting before the adverse weather.

According to an embodiment of the present disclosure, technology related to harvesting a crop is improved.

DETAILED DESCRIPTION

Hereinafter, an embodiment of the present disclosure will be described.

Outline of Embodiment

Figure 1:
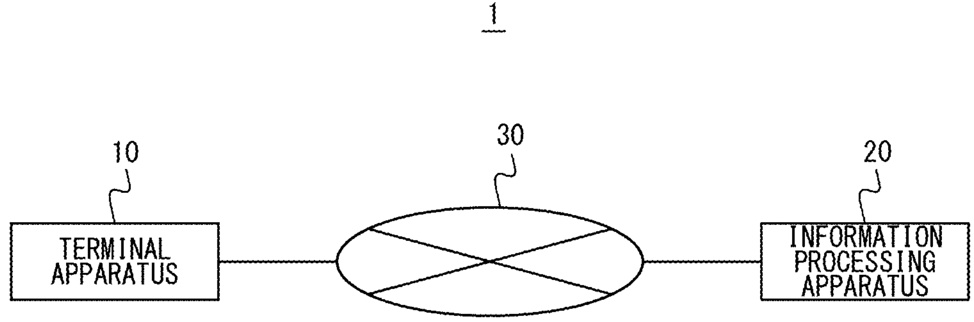
FIG. 1 is a block diagram illustrating a schematic configuration of a system according to an embodiment of the present disclosure.

An outline of a system 1 according to an embodiment of the present disclosure will be described with reference to FIG. 1. The system 1 includes a terminal apparatus 10 and an information processing apparatus 20. The terminal apparatus 10 and the information processing apparatus 20 are communicably connected to a network 30 including, for example, the Internet, a mobile communication network, or the like.

The terminal apparatus 10 is, for example, a general purpose electronic device, such as a smartphone, a tablet, or a personal computer (PC). The user of the terminal apparatus 10 is the manager of a field in the present embodiment, but this example is not limiting. For example, the user of the terminal apparatus 10 may be a worker who performs various tasks in the field (such as cultivating and harvesting crops, and repairing facilities for cultivation). The user may operate the terminal apparatus 10 to confirm information about crops in the field. The number of terminal apparatuses 10 included in the system 1 and the number of fields managed by the user of the terminal apparatus 10 can be freely determined.

The information processing apparatus 20 is, for example, a computer such as a server apparatus. The information processing apparatus 20 can communicate with the terminal apparatus 10 via the network 30.

First, an outline of the present embodiment will be described, and details thereof will be described later. In a case in which the information processing apparatus 20 predicts, based on weather information, that there will be adverse weather that could cause damage to a crop in a field, the information processing apparatus 20 presents reference information and proposes harvesting before the adverse weather. The presentation of reference information and proposed harvest time may be transmitted to the terminal apparatus 10 used by the manager of the corresponding field. In the present embodiment, the start date of the optimum harvest period for crops is assumed to arrive later than the day of the adverse weather. In other words, a harvest before the adverse weather is considered to be a harvest before the optimum harvest period for crops (hereinafter also referred to as an "early harvest").

In this way, according to the present embodiment, in a case in which adverse weather, such as a typhoon, is predicted, the user of the terminal apparatus 10 is, for example, presented with reference information, and harvesting before the adverse weather is proposed. The user of the terminal apparatus 10 can refer to the presented reference information to determine whether harvesting should be done before the adverse weather or whether harvesting should wait until the optimum harvest period after the adverse weather. Technology related to harvesting a crop is thus improved in that it is easier to determine the timing for harvesting a crop in a case in which adverse weather is predicted.

Next, configurations of the system 1 will be described in detail.

<Terminal Apparatus Configuration>

Figure 2:
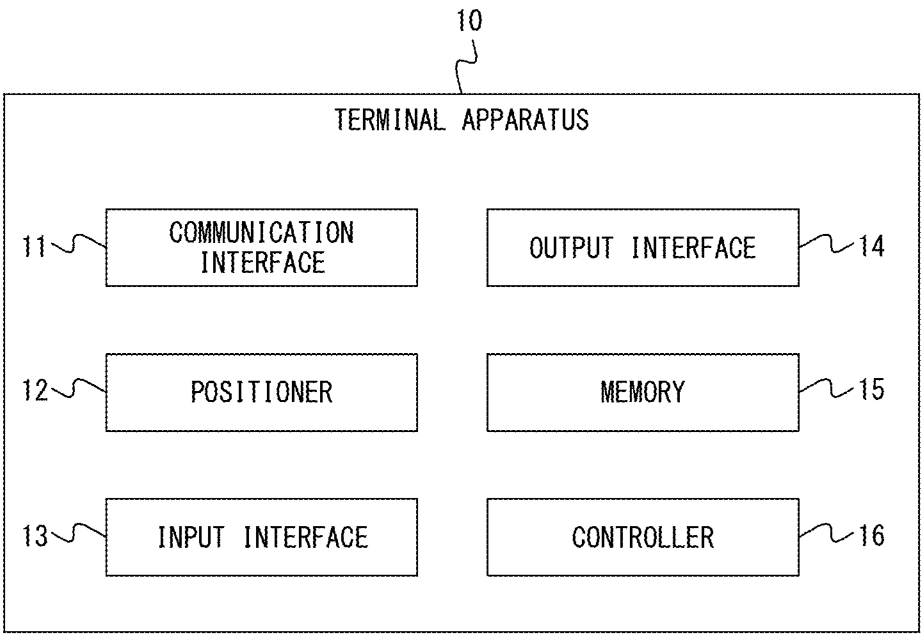
FIG. 2 is a block diagram illustrating a schematic configuration of a terminal apparatus.

As illustrated in FIG. 2, the terminal apparatus 10 includes a communication interface 11, a positioner 12, an input interface 13, an output interface 14, a memory 15, and a controller 16.

The communication interface 11 includes at least one communication interface for connecting to the network. The communication interface is compliant with mobile communication standards such as the 4th generation (4G) standard or the 5th generation (5G) standard, for example, but these examples are not limiting. In the present embodiment, the terminal apparatus 10 communicates with the information processing apparatus 20 via the communication interface 11 and the network 30.

The positioner 12 includes at least one device for acquiring positional information for the terminal apparatus 10. Specifically, the positioner 12 includes a receiver corresponding to the Global Positioning System (GPS), for example, but is not limited to this and may include a receiver corresponding to any satellite positioning system.

The input interface 13 includes at least one interface for input. The interface for input is, for example, a physical key, a capacitive key, a pointing device, or a touch screen integrally provided with a display. The input interface 13 accepts an operation for inputting data to be used for the operations of the terminal apparatus 10. The input interface 13 may be connected to the terminal apparatus 10 as an external input device, instead of being included in the terminal apparatus 10. As an interface for connection, for example, an interface compliant with a standard such as Universal Serial Bus (USB), High-Definition Multimedia Interface (HDMI®) (HDMI is a registered trademark in Japan, other countries, or both), or Bluetooth® (Bluetooth is a registered trademark in Japan, other countries, or both) can be used.

The output interface 14 may include at least one output device for outputting information to notify the user of the information. The output device is a display for outputting information as images or video, a speaker for outputting information as audio, or the like, for example, but is not limited to these. The display is, for example, a liquid crystal display (LCD) or an organic electro luminescent (EL) display. The output interface 14 may include an interface for connecting to an external output device.

The memory 15 includes one or more memories. The memories are semiconductor memories, magnetic memories, optical memories, or the like, for example, but are not limited to these. The memories included in the memory 15 may each function as, for example, a main memory, an auxiliary memory, or a cache memory. The memory 15 stores any information to be used for operations of the terminal apparatus 10. For example, the memory 15 may store a system program, an application program, embedded software, and the like. The information stored in the memory 15 may be updated with, for example, information acquired from the network 30 via the communication interface 11.

The controller 16 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 16 controls the operations of the entire terminal apparatus 10.

<Information Processing Apparatus Configuration>

Figure 3:
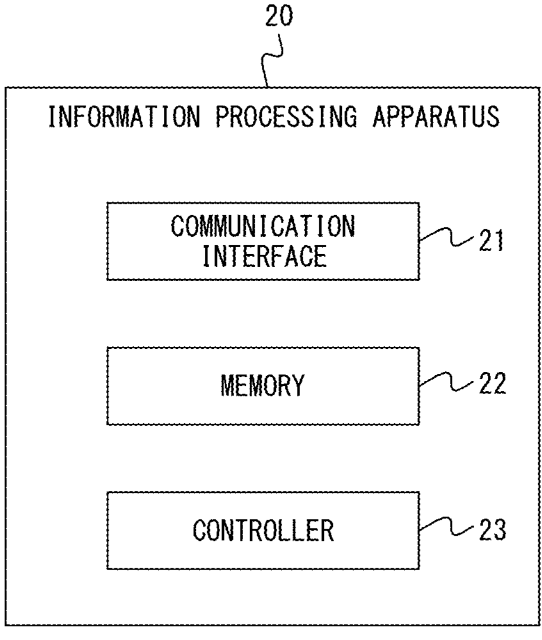
FIG. 3 is a block diagram illustrating a schematic configuration of an information processing apparatus.

As illustrated in FIG. 3, the information processing apparatus 20 includes a communication interface 21, a memory 22, and a controller 23.

The communication interface 21 includes at least one communication interface for connecting to the network 30. The communication interface may be compliant with, for example, mobile communication standards, wired local area network (LAN) standards, or wireless LAN standards, but these examples are not limiting. The communication interface may be compliant with any appropriate communication standards. In the present embodiment, the information processing apparatus 20 communicates with the terminal apparatus 10 via the communication interface 21 and the network 30.

The memory 22 includes one or more memories. The memories included in the memory 22 may each function as, for example, a main memory, an auxiliary memory, or a cache memory. The memory 22 stores any information used for operations of the information processing apparatus 20. For example, the memory 22 may store a system program, an application program, a database, map information, weather information, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire information processing apparatus 20.

In the present embodiment, the controller 23 acquires positional information for the field managed by the user of the terminal apparatus 10 from the communication interface 11 of the terminal apparatus 10 via the network 30 and the communication interface 21 and stores the acquired positional information for the field in a database of the memory 22. Any method can be employed to acquire the positional information for the field. For example, the controller 23 may acquire positional information for the field by receiving information indicating the location of the field as inputted by the user via the input interface 13 of the terminal apparatus 10. Alternatively, the information processing apparatus 20 may include an internal or external database that stores the positional information, the area, the agricultural product, and the like for the field managed by the user, and the controller 23 may retrieve the necessary information from the database. The controller 23 acquires weather data via the network 30 and the communication interface 21 and stores the acquired weather data in the database of the memory 22. In the present embodiment, the weather data includes agricultural weather information and disaster prevention weather information for various regions of Japan, including fields, provided by the Japan Meteorological Agency and Meteorological Observatories.

The agricultural weather information is information indicating weather relevant to agriculture and is provided for the purpose of preventing and mitigating weather-related agricultural disasters. For example, the agricultural weather information includes information on abnormal weather (such as high temperatures, light rainfall, or heavy snowfall).

Disaster prevention weather information is information on weather that causes agricultural weather disasters that damage crops in a short period of time (hereinafter also referred to as "adverse weather"). For example, disaster prevention weather information includes information that indicates the weather for several days ahead (such as five days ahead) with regard to agricultural weather disasters. The disaster prevention weather information also includes early warning information issued several days before the expected date of occurrence of an agricultural weather disaster; advisories, warnings, and emergency warnings issued in stages according to the subsequent increase in the level of risk; and weather information that supplements these advisories, warnings, and emergency warnings (hereinafter collectively referred to as "advisories and the like"). The criteria for issuing advisories and the like are set using indicators (weather conditions such as wind speed or rainfall index) that are closely linked to the occurrence of disasters. For example, a value such that "if wind speed reaches or exceeds this value, a disaster may occur" is set as the criteria for an advisory. Advisories and the like are then issued when a phenomenon that reaches the criteria (an advisory, warning, or emergency warning level phenomenon) is expected.

However, weather data is not limited to these examples and can include any data provided by any source in any region. In addition, weather data can include not only current information but also historical information.

<Flow of Operations of Information Processing Apparatus>

Figure 4:
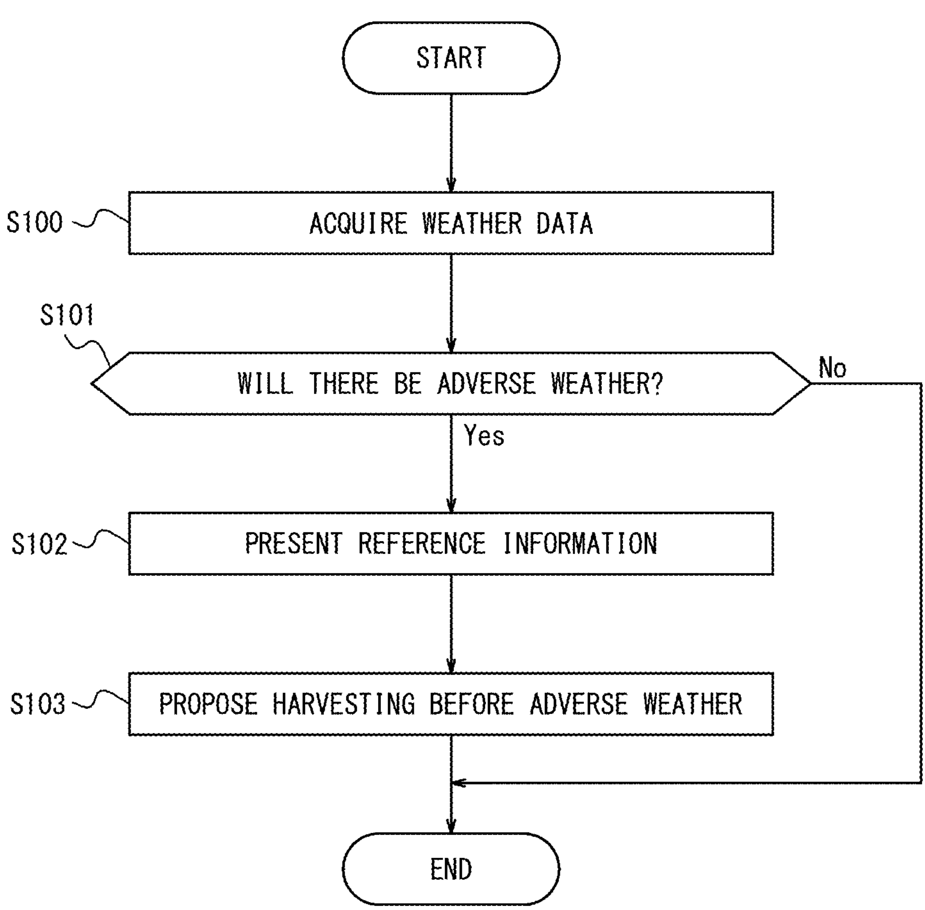
FIG. 4 is a flowchart illustrating operations of the information processing apparatus.

Operations of the information processing apparatus 20 according to the present embodiment will be described with reference to FIG. 4. The operations in FIG. 4 correspond to a method according to the present embodiment. The operations in FIG. 4 are performed repeatedly, for example, at a predetermined period. The predetermined period can be freely determined.

Step S100: the controller 23 of the information processing apparatus 20 acquires weather data.

Specifically, the controller 23 searches the database of the memory 22 to acquire weather data indicating the weather of the field managed by the user of the terminal apparatus 10 as the weather data for the field. The controller 23 can acquire the weather data by reading the weather data for the field from the memory 22 each time the operations in FIG. 4 are executed.

Step S101: the controller 23 determines whether there will be adverse weather that could cause damage to crops in the field based on the weather data acquired in step S100. In a case in which it is determined that there will be adverse weather that could cause damage to crops in the field (S101: Yes), the process advances to step S102. Conversely, in a case in which it is determined that there will not be adverse weather that could cause damage to crops in the field (S101: No), the process ends.

Specifically, the controller 23 determines whether the weather data acquired in step S100 indicates an advisory or the like for the region of the field. In a case in which an advisory or the like is indicated by the weather data, the controller 23 determines that there will be adverse weather that could cause damage to crops in the field. For example, in a case in which early warning information for heavy rain and hazardous winds due to a typhoon is indicated by the weather data, the controller 23 determines that there will be adverse weather that could cause damage to crops in the field. However, the determination of adverse weather is not limited to these examples, and any appropriate method can be employed, such as determination from individual forecast data of wind speed and rainfall.

Step S102: in a case in which it is determined that there will be adverse weather that could cause damage to crops in the field (S101: Yes), the controller 23 presents reference information.

Specifically, the controller 23 presents the reference information by transmitting information indicating the impact of adverse weather on crops to the communication interface 11 of the terminal apparatus 10, via the network 30 and the communication interface 21, and notifying the user via the output interface 14. The presentation of reference information facilitates a determination by the user of the terminal apparatus 10 as to whether to harvest before the adverse weather. First through fifth examples are as illustrated below as examples of the reference information.

In the first example, the controller 23 presents the projected profit of the crop for each harvest timing as the reference information. Specifically, after the determination in step S102, the controller 23 calculates the projected profit for each day in a case in which the crop is harvested during the period from a few days before the adverse weather to the estimated end date of the optimum harvest period (hereinafter also referred to as "candidate harvest period"). The start date and end date of the optimum harvest period can be estimated based on statistical data or by machine learning.

Any appropriate method can be employed to calculate the projected profit for each day. For example, the controller 23 calculates the projected profit for each day of the candidate harvest period, which is taken as the 14 days from 4 days prior to the adverse weather. Any appropriate method can be employed to calculate the projected profit for each day. For example, the controller 23 stores yield and quality information (such as sugar content or ripeness) for each year for the crop harvested in the field, along with income and expenditure results for the field, in the database of the memory 22. The controller 23 also stores the measures taken in the field (such as repairs to facilities for cultivation), the target average price of the crop, and the actual average price of the crop, in correspondence with past incidents of adverse weather (for example, weather conditions such as wind speed or rainfall index), in the database of the memory 22. In a case in which adverse weather is predicted, the controller 23 then extracts data corresponding to similar weather conditions (for example, weather conditions with a match rate equal to or greater than a predetermined threshold) from the database of the memory 22 and estimates the yield and quality of the crop for each day of the candidate harvest period.

Any method can be employed to estimate yield and quality of the crop. For example, the controller 23 may calculate a percentage index (for example, a continuous value from 0% to 100%) indicating the yield and quality for each day prior to the estimated start date of the optimum harvest period (i.e., each day of early harvest), with the yield and quality of the optimum harvest period being 100%. Typically, the yield and quality for each day prior to the estimated start date of the optimum harvest period can be calculated so that as the day is closer to the estimated start date, the percentage index is higher. The controller 23 can calculate the projected profit for each day of the candidate harvest period based on each calculated percentage index indicating the quality and yield. At this time, the controller 23 predicts the amount of damage caused by adverse weather based on data corresponding to similar weather conditions (the cost of repairing facilities for cultivation, the rate of decrease in the average crop price, or the like) and reflects the prediction in the calculation of projected profit. On the other hand, in a case in which similar weather conditions are not extracted, the controller 23 may calculate the projected profit for each day of the candidate harvest period based on, for example, the average profit for the past several years multiplied by a predetermined coefficient (for example, a coefficient based on the severity of weather conditions).

This enables the controller 23 to calculate the projected profit of the crop for each harvest timing, taking into account the damage that could occur to the crop. The controller 23 then presents the projected profit of the crop for each harvest timing by transmitting data indicating the calculated projected profit to the communication interface 11 of the terminal apparatus 10, via the network 30 and the communication interface 21, and notifying the user via the output interface 14. As a result, the user of the terminal apparatus 10 can determine even more easily whether to harvest before the adverse weather, taking into account the balance between the damage that could occur to the crop and the impact of early harvesting on the crop.

In the second example, the controller 23 presents a maximum projected profit of the crop for each harvest timing as the reference information, the maximum projected profit being calculated based on a score that is an evaluation index of the crop. Specifically, the controller 23 acquires a score for each harvest timing, i.e., each day of the candidate harvest period. In the present embodiment, the score is an evaluation index of the crop and includes, but is not limited to, a score that evaluates the quality (sugar content, ripeness, or the like) of the crop as of the harvest date (hereinafter also referred to as "quality score") and a score that evaluates the logistics cost for shipping the crop (hereinafter also referred to as "logistics score").

The quality score is indicated by a percentage index (for example, a continuous value from 0% to 100%) indicating the quality for each day prior to the estimated start date of the optimum harvest period (i.e., each day of early harvest), with the quality of the optimum harvest period being 100%. A higher value indicates higher quality of the crop. Typically, the quality score can be calculated so that as the harvest date is closer to the estimated start date of the optimum harvest period, the value is higher.

The logistics score is a numerical value (for example, an integer between 0 and 100) that indicates the logistics cost (such as the transportation time or transportation cost to each destination) for shipping the crop, with a lower value indicating a smaller impact on the average price of the crop (higher projected profit). Any appropriate method can be employed to calculate the logistics score. For example, the logistics score may be calculated in different ways depending on the type of crop, such as with or without subsequent ripening. In the case of crops that do not subsequently ripen, a shipping destination with a shorter transportation time is preferable to control the decline in quality of the crop. In this case, transportation time can be emphasized over transportation cost to calculate the logistics score so that the numerical value is reduced as the shipping destination has a shorter transportation time. On the other hand, in the case of crops that subsequently ripen, there is a certain amount of leeway between harvest and full ripeness. Shipping destinations with long transportation times can therefore be acceptable. For example, some crops are allowed to ripen for 30 days or more after harvest before being shipped (such as some pears). In this case, transportation cost can be emphasized over transportation time to calculate the logistics score so that the numerical value is reduced as the shipping destination has a lower transportation cost. The explanation here assumes that only one transportation option exists, but in the case of a plurality of transportation options (for example, in-house, chartered, or mixed), the controller 23 may calculate a logistics score for each transportation option.

The controller 23 then calculates the maximum projected profit for each day of the candidate harvest period based on the acquired score for each day of the candidate harvest period. Any appropriate method can be employed to calculate the maximum projected profit. For example, the controller 23 may determine, for each day of the candidate harvest period, a value obtained by first multiplying the average profit over the past several years by a predetermined coefficient (for example, a coefficient based on the severity of the weather conditions) and then multiplying by a quality score (percentage index). The controller 23 can calculate the maximum projected profit as the value yielded by subtracting the transportation cost of shipping to the destination with the lowest logistics score from the determined value. In other words, the shipping destination can be adjusted according to the type or characteristics of the agricultural product to maximize the projected profit. The controller 23 then presents the maximum projected profit of the crop for each harvest timing by transmitting the maximum projected profit calculated for each day of the candidate harvest period to the communication interface 11 of the terminal apparatus 10, via the network 30 and the communication interface 21, and notifying the user via the output interface 14. As a result, the user of the terminal apparatus 10 can determine even more easily whether to harvest before the adverse weather, taking into account the balance between the damage that could occur to the crop and the impact of early harvesting on the crop.

In the third example, the controller 23 presents the market price of the crop for each harvest timing as the reference information, the market price being obtained by providing a potential purchaser of the crop with quality information on the crop for each harvest timing. Specifically, the controller 23 estimates the quality (sugar content, ripeness, or the like) of the crop for each harvest timing. Any method can be employed to estimate the quality of the crop for each harvest timing. For example, the controller 23 may estimate the quality of the crop for each harvest timing by calculating the quality score described above in the second example. The controller 23 may also estimate the quality of the crop for each harvest timing based on statistical data or by machine learning. The controller 23 provides quality information on the crop for each harvest timing to potential purchasers of the crop by transmitting the estimated quality of the crop for each harvest timing to external apparatuses, such as PCs used by the potential purchasers of the crop, via the network 30 and the communication interface 21 for the quality information to be outputted. The potential purchasers of the crop refer to the quality information to determine a desired purchase price. The external apparatuses return information indicating the desired purchase price of the crop to the communication interface 21 of the information processing apparatus 20 via the network 30 and the communication interface 21. The controller 23 of the information processing apparatus 20 can acquire the market price of the crop for each harvest timing by aggregating the received desired purchase prices. The controller 23 presents the market price of the crop for each harvest timing by transmitting the acquired market price of the crop for each harvest timing to the communication interface 11 of the terminal apparatus 10, via the network 30 and the communication interface 21, and notifying the user via the output interface 14. For example, in a case in which the crop is sold directly to individual consumers via the Internet as the network 30, an individual user of the terminal apparatus 10 could determine the price of the crop. In such a case, the user of the terminal apparatus 10 is more likely to enter into a contract for the sale of the crop with the prospective purchaser who offers the highest purchase price among the offered market prices, for example, before harvesting before the adverse weather.

In the fourth example, the controller 23 presents past damage information for the field under similar weather conditions to the adverse weather as the reference information. Specifically, the controller 23 stores an agricultural weather disaster history (history of damage due adverse weather such as typhoons) for the field in the database of the memory 22. In a case in which adverse weather is predicted, the controller 23 presents past damage information for the field under similar weather conditions to the adverse weather by extracting data corresponding to similar weather conditions from the database, transmitting the data to the terminal apparatus 10, and notifying the user via the output interface 14. For example, the user of the terminal apparatus 10 can obtain information on damage that occurred in the field, such as the fact that in years when the crop was not harvested before adverse weather with similar weather conditions, the yield and average price of the crop were 50% lower than the target average price of the crop set under the assumption of no adverse weather. By such information being presented as the reference information, the user of the terminal apparatus 10 can determine even more easily whether to harvest before the adverse weather, taking into account the balance between the damage that could occur to the crop and the impact of early harvesting on the crop.

Figure 5:
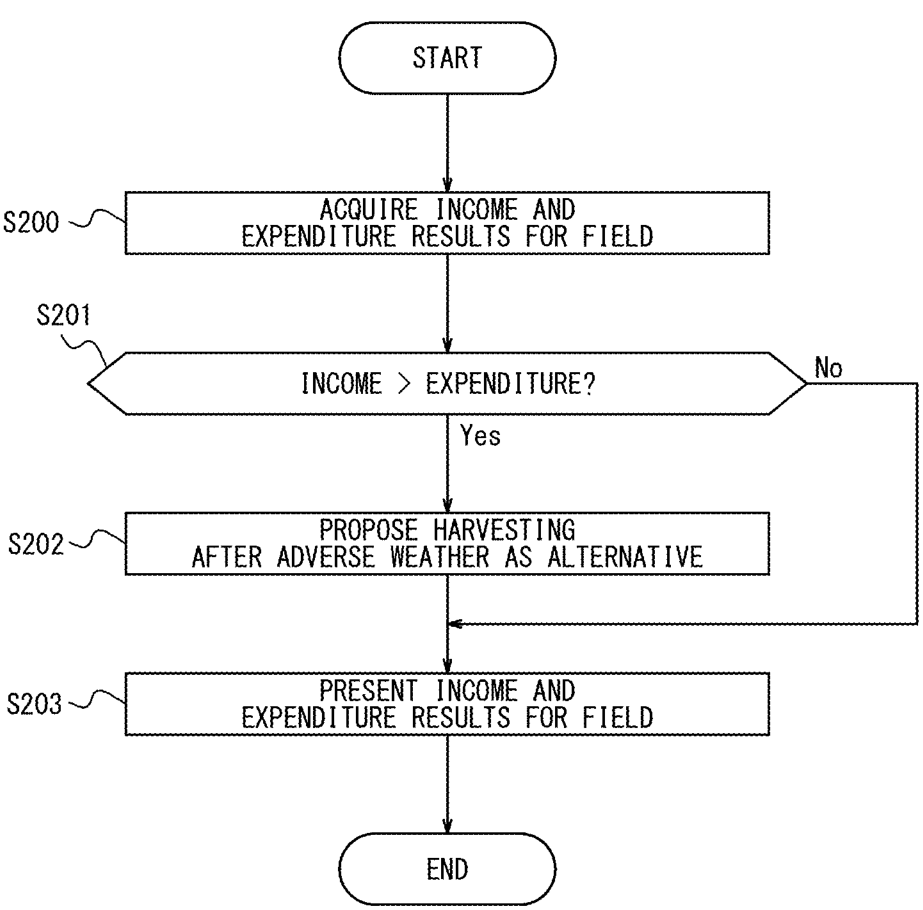
FIG. 5 is a flowchart of the processing procedures to propose harvesting after adverse weather.

In the fifth example, the controller 23 presents the income and expenditure results for the field as the reference information. Any method can be employed to present the income and expenditure results for the field. For example, the controller 23 may receive income and expenditure information for the field managed by the user of the terminal apparatus 10 from the communication interface 11 of the terminal apparatus 10 via the network 30 and the communication interface 21 and accumulate the information in a database of the memory 22. In this case, the controller 23 acquires the income and expenditure results for the field by reading the accumulated income and expenditure information for the field each time the operations in FIG. 5 are executed. The controller 23 then presents the income and expenditure results for the field by transmitting the acquired income and expenditure results to the communication interface 11 of the terminal apparatus 10, via the network 30 and the communication interface 21, and notifying the user via the output interface 14.

The description now returns to the flowchart in FIG. 4.

Step S103: the controller 23 proposes harvesting before the adverse weather. The process then ends.

Specifically, the controller 23 proposes harvesting before the adverse weather by transmitting information indicating a recommendation level for harvesting before the adverse weather (hereinafter also referred to as "first information") to the communication interface 11 of the terminal apparatus 10, via the network 30 and the communication interface 21, and notifying the user via the output interface 14. Any information can be adopted as the first information. For example, the first information may be a grade (such as "low", "medium", "high"). The grade of the first information may be set according to the severity of the weather conditions of the adverse weather indicated by the weather data. Typically, the first information can be set so that the grade is higher as the severity of the weather conditions of the adverse weather (wind speed, rainfall index, or the like) is higher, i.e., as the likelihood of a serious disaster is higher. This is because in a case in which the crop cannot withstand the adverse weather and the yield or average price declines, the impact on agricultural management could be severe. In this way, in a case in which it is predicted, based on weather data, that there will be adverse weather that could cause damage to a crop in the field, it can be useful to propose harvesting before the adverse weather to the user of the terminal apparatus 10, who is the manager of the field. For example, in a case in which the grade of the first information is "high", the user of the terminal apparatus 10 can more easily determine to harvest before the adverse weather, placing importance on mitigating the impact of the adverse weather on the crop.

In this way, by executing steps S102 and S103, the controller 23 presents the reference information and proposes harvesting before the adverse weather.

As described above, in a case in which the information processing apparatus 20 according to the present embodiment predicts, based on weather information, that there will be adverse weather that could cause damage to a crop in a field, the information processing apparatus 20 presents reference information and proposes harvesting before the adverse weather.

According to such a configuration, in a case in which adverse weather, such as a typhoon, is predicted, the user of the terminal apparatus 10 is presented with reference information, and harvesting before the adverse weather is proposed. The user of the terminal apparatus 10 can refer to the presented reference information to determine whether harvesting should be done before the adverse weather or whether harvesting should wait until the optimum harvest period after the adverse weather. Technology related to harvesting a crop is thus improved in that it is easier to determine the timing for harvesting a crop in a case in which adverse weather is predicted.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in one variation of the present embodiment, in the fifth example described above in step S102, the controller 23 may propose harvesting after the adverse weather as an alternative in a case in which there is a surplus (i.e., being "in the black") in income and expenditure for a predetermined period as indicated by the income and expenditure results. In this case, harvesting after the adverse weather is also proposed to the user of the terminal apparatus 10 as an alternative in addition to harvesting before the adverse weather as described above. Any method can be employed to propose the alternative. For example, the controller 23 may propose harvesting after the adverse weather (the alternative) by performing the operations illustrated in FIG. 5. The operations in FIG. 5 are described below.

Step S200: the controller 23 acquires the income and expenditure results for the field. The processing in this step is similar to the processing described above in the fifth example, and thus a description thereof is omitted.

Step S201: the controller 23 determines whether there is a surplus in the income and expenditure for a predetermined period as indicated by the income and expenditure results acquired in step S200. In a case in which there is a surplus in the income and expenditure for a predetermined period (step S201: Yes), the process advances to step S202. Conversely, in a case in which there is no surplus in the income and expenditure for a predetermined period (i.e., being "in the red"), the process advances to step S203. In other words, the processing for presenting the income and expenditure results for the field (step S203) is performed without performing the below-described process for proposing harvesting after the adverse weather as an alternative (step S202).

The predetermined period is specified by the user of the terminal apparatus 10 in the present embodiment, but this example is not limiting, and the predetermined period can be set using any method. In a case in which the predetermined period is a single period (for example, the previous year), the controller 23 determines that there is a surplus in income and expenditure for the predetermined period when income for the period exceeds expenditure (production costs). On the other hand, in a case in which the predetermined period includes a plurality of periods (for example, the past several years), the controller 23 may determine that there is a surplus in income and expenditure for the predetermined period when there are more periods in the black upon comparing income and expenditure for each period, or when the total income for all periods exceeds the total expenditure.

Step S202: in a case in which there is a surplus in the income and expenditure for the predetermined period (step S201: Yes), the controller 23 proposes harvesting after the adverse weather as an alternative.

Specifically, the controller 23 proposes harvesting after the adverse weather as an alternative by transmitting information indicating a recommendation level for harvesting after the adverse weather (hereinafter also referred to as "second information") to the communication interface 11 of the terminal apparatus 10, via the network 30 and the communication interface 21, and notifying the user via the output interface 14. Any information can be adopted as the second information. For example, the second information may be a grade (such as "low", "medium", "high"). The grade of the second information may be set according to the magnitude of the surplus in the income and expenditure for a predetermined period. Typically, the second information can be set so that the grade is higher as the surplus in the income and expenditure for a predetermined period is greater. In a case in which the surplus in the income and expenditure for a predetermined period is large (the case of being substantially in the black), there is also more leeway to choose harvesting after the adverse weather, which is more risky than harvesting before the adverse weather. This is because even in a case in which the crop cannot withstand the adverse weather and the yield or average price declines, the impact on agricultural management is relatively small compared to the case of the income and expenditure for the predetermined period being in the red. In this way, for a user of the terminal apparatus 10 who has a large surplus in the income and expenditure for a predetermined period, it can be useful to propose harvesting after the adverse weather as an alternative, in addition to proposing harvesting before the adverse weather as described above. For example, in a case in which the grade of the second information is "high", the user of the terminal apparatus 10 can more easily take measures other than harvesting (for example, maintaining drainage channels, installing covering materials, or repairing facilities for cultivation) and determine to wait until the optimum harvest period to harvest.

Step S203: the controller 23 presents the income and expenditure results for the field as the reference information. The processing in this step is similar to the processing described above in the fifth example, and thus a description thereof is omitted. The process then ends.

For the sake of explanation, the income and expenditure results for the field have been described as being presented (step S203) after the proposal to harvest after the adverse weather (step S202), but steps S202 and S203 may be executed in parallel. After the process in FIG. 5 is completed, the processing returns to step S103 in FIG. 4 and continues.

For example, an embodiment in which the configuration and operations of the information processing apparatus 20 in the above embodiment are distributed to multiple computers capable of communicating with each other can be implemented. For example, an embodiment in which some or all of the components of the information processing apparatus 20 are provided in the terminal apparatus 10 can also be implemented.

For example, an embodiment in which a general purpose computer functions as the information processing apparatus 20 according to the above embodiment can also be implemented. Specifically, a program in which processes for realizing the functions of the information processing apparatus 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus comprising a controller, wherein in a case in which the controller predicts, based on weather data, that there will be adverse weather that could cause damage to a crop in a field, the controller is configured to present reference information and propose harvesting before the adverse weather.

[Appendix 2] The information processing apparatus according to appendix 1, wherein the controller is configured to present a projected profit of the crop for each harvest timing as the reference information.

[Appendix 3] The information processing apparatus according to appendix 2, wherein the controller is configured to present a maximum projected profit of the crop for each harvest timing as the reference information, the maximum projected profit being calculated based on a score that is an evaluation index of the crop.

[Appendix 4] The information processing apparatus according to any one of appendices 1 to 3, wherein the controller is configured to present a market price of the crop for each harvest timing as the reference information, the market price being obtained by providing a potential purchaser of the crop with quality information on the crop for each harvest timing.

[Appendix 5] The information processing apparatus according to any one of appendices 1 to 4, wherein the controller is configured to present past damage information for the field under similar weather conditions to the adverse weather as the reference information.

[Appendix 6] The information processing apparatus according to any one of appendices 1 to 5, wherein the controller is configured to present income and expenditure results for the field as the reference information.

[Appendix 7] The information processing apparatus according to appendix 6, wherein the controller is configured to propose harvesting after the adverse weather as an alternative in a case in which there is a surplus in income and expenditure for a predetermined period as indicated by the income and expenditure results.

[Appendix 8] A method to be executed by an information processing apparatus, the method comprising: presenting, in a case in which it is predicted based on weather data that there will be adverse weather that could cause damage to a crop in a field, reference information and proposing harvesting before the adverse weather.

[Appendix 9] The method according to appendix 8, further comprising presenting a projected profit of the crop for each harvest timing as the reference information.

[Appendix 10] The method according to appendix 9, further comprising presenting a maximum projected profit of the crop for each harvest timing as the reference information, the maximum projected profit being calculated based on a score that is an evaluation index of the crop.

[Appendix 11] The method according to any one of appendices 8 to 10, further comprising presenting a market price of the crop for each harvest timing as the reference information, the market price being obtained by providing a potential purchaser of the crop with quality information on the crop for each harvest timing.

[Appendix 12] The method according to any one of appendices 8 to 11, further comprising presenting past damage information for the field under similar weather conditions to the adverse weather as the reference information.

[Appendix 13] The method according to any one of appendices 8 to 12, further comprising presenting income and expenditure results for the field as the reference information.

[Appendix 14] The method according to appendix 13, further comprising proposing harvesting after the adverse weather as an alternative in a case in which there is a surplus in income and expenditure for a predetermined period as indicated by the income and expenditure results.

[Appendix 15] A non-transitory computer readable medium storing a program configured to cause an information processing apparatus to execute operations, the operations comprising: presenting, in a case in which it is predicted based on weather data that there will be adverse weather that could cause damage to a crop in a field, reference information and proposing harvesting before the adverse weather.

[Appendix 16] The non-transitory computer readable medium according to appendix 15, wherein the operations further comprise presenting a projected profit of the crop for each harvest timing as the reference information.

[Appendix 17] The non-transitory computer readable medium according to appendix 16, wherein the operations further comprise presenting a maximum projected profit of the crop for each harvest timing as the reference information, the maximum projected profit being calculated based on a score that is an evaluation index of the crop.

[Appendix 18] The non-transitory computer readable medium according to any one of appendices 15 to 17, wherein the operations further comprise presenting a market price of the crop for each harvest timing as the reference information, the market price being obtained by providing a potential purchaser of the crop with quality information on the crop for each harvest timing.

[Appendix 19] The non-transitory computer readable medium according to any one of appendices 15 to 18, wherein the operations further comprise presenting past damage information for the field under similar weather conditions to the adverse weather as the reference information.

[Appendix 20] The non-transitory computer readable medium according to any one of appendices 15 to 19, wherein the operations further comprise presenting income and expenditure results for the field as the reference information.

The invention claimed is:

1. A method comprising:

in response to a controller of an information processing apparatus predicting, based on weather data, that there will be adverse weather that could cause damage to a crop in a field, presenting, by the controller, income and expenditure results for the field and proposing harvesting the crop before the adverse weather;

in response to the controller determining that there is a surplus in income and expenditure for a predetermined period as indicated by the income and expenditure results, proposing, by the controller, harvesting the crop after the adverse weather as an alternative; and in response to the controller proposing harvesting the crop after the adverse weather as the alternative, performing at least one of maintaining drainage channels, installing covering materials, or repairing facilities for cultivation before harvesting the crop, wherein said proposing harvesting the crop before the adverse weather comprises transmitting, by the controller, to a terminal apparatus, first information indicating a first recommendation level for harvesting the crop before the adverse weather, the first recommendation level increases as severity of weather conditions of the adverse weather indicated by the weather data increases, said proposing harvesting the crop after the adverse weather as the alternative comprises transmitting, by the controller, to the terminal apparatus, second information indicating a second recommendation level for harvesting the crop after the adverse weather, and the second recommendation level increases as the surplus in the income and expenditure for the predetermined period increases.

2. The method according to claim 1, further comprising presenting, by the controller, a projected profit of the crop for each harvest timing.

3. The method according to claim 2, further comprising presenting, by the controller, a maximum projected profit of the crop for each harvest timing, the maximum projected profit being calculated based on a score that is an evaluation index of the crop.

4. The method according to claim 3, wherein the score includes a quality score that evaluates a quality of the crop for each day and a logistics score that evaluates a logistics cost for shipping the crop, and the method further comprises calculating, by the controller, the maximum projected profit by:

determining, for each day of a candidate harvest period, a value obtained by first multiplying an average profit over past years by a predetermined coefficient based on severity of weather conditions and then multiplying by the quality score; and subtracting from the determined value, a transportation cost of shipping the crop to a destination with the lowest logistics score.

5. The method according to claim 4, wherein the projected profit increases as the logistics score decreases, in a case that the crop is a first crop that does not subsequently ripen, the controller emphasizes a transportation time over a transportation cost to calculate the logistics score so that the logistics score is reduced as a shipping destination has a shorter transportation time, and in a case that the crop is a second crop that subsequently ripens, the controller emphasizes the transportation cost over the transportation time to calculate the logistics score so that the logistics score is reduced as the shipping destination has a lower transportation cost.

6. The method according to claim 1, further comprising presenting, by the controller, a market price of the crop for each harvest timing, the market price being obtained by providing a potential purchaser of the crop with quality information on the crop for each harvest timing.

7. The method according to claim 1, further comprising presenting, by the controller, past damage information for the field under similar weather conditions to the adverse weather.

8. The method according to claim 1, further comprising:

in response to the controller determining that there is no surplus in the income and expenditure for the predetermined period, presenting, by the controller, the income and expenditure results for the field without proposing harvesting the crop after the adverse weather as the alternative.

* * * * *